US005293897A

United States Patent [19]

Warga et al.

[11] Patent Number: 5,293,897

[45] Date of Patent: Mar. 15, 1994

[54] PRESSURE VALVE

[75] Inventors: Johann Warga, Bietigheim-Bissingen; Wolfgang Haydn, Stuttgart; Uwe Kuhn, Riederich, all of Fed. Rep. of Germany

[73] Assignee: Robert Bosch GmbH, Stuttgart, Fed. Rep. of Germany

[21] Appl. No.: 10,717

[22] Filed: Jan. 29, 1993

[30] Foreign Application Priority Data

Feb. 1, 1992 [DE] Fed. Rep. of Germany ....... 4202853

[51] Int. Cl.[5] .............................................. F16K 17/18

[52] U.S. Cl. .............................. 137/493.3; 137/539.5; 417/296

[58] Field of Search ............... 137/493.3, 493.4, 539.5; 123/506; 417/296

[56] References Cited

U.S. PATENT DOCUMENTS 4,692,102 9/1987 Hafele .......................... 137/539.5 X
4,926,902 5/1990 Nakamura ....................... 417/296 X
4,930,553 6/1990 Grillo ............................... 137/539.5

FOREIGN PATENT DOCUMENTS 3904518 8/1990 Fed. Rep. of Germany .
153256 6/1990 Japan .................................. 123/506

*Primary Examiner*—Robert G. Nilson
*Attorney, Agent, or Firm*—Edwin E. Greigg; Ronald E. Greigg

[57] ABSTRACT

A pressure valve to be secured into a supply line between a pump work chamber of a fuel injection pump and a injection location of an internal combustion engine to be supplied with fuel. A pressure valve closing element provided with a sealing face is pressed by a compression spring onto a valve body provided with a valve seat. To reduce pressure waves in the supply line caused by a sudden closing of the pressure valve, a check valve that opens in the direction of the pump work chamber, and that comprises a valve seat, a valve closing element, a spring plate and a restoring spring is disposed in a through conduit of the pressure valve closing element, which is preceded by a throttle restriction. Throttling of the fuel flowing downstream of the check valve is avoided by disposing a through conduit in the spring plate. A filler piece inserted into the through conduit and defining the opening stroke of the check valve, also has a longitudinal bore that opens into a transverse bore for an unthrottled fuel flow.

9 Claims, 2 Drawing Sheets

PRESSURE VALVE

BACKGROUND OF THE INVENTION

The invention is based on a pressure valve as defined hereinafter. With such a pressure valve known from DE 39 04 518 A1, which is arranged in a supply line between a pump work chamber and an injection location, a valve closing element is lifted from its valve seat counter to the force of a spring by means of a medium under great pressure that is fed from the pump work chamber via the supply line to the pressure valve, causing the pressure valve to open. At the end of the high-pressure pumping, the pressure valve element returns to its seat. At the same time, an injection valve closes at the injection location, by means of which pressure waves that are in a position to re-open the injection valve run back and forth in the volume confined between the pressure valve and the injection valve. To avoid this a check valve that is guided by its closing element into the valve closing element is arranged in the interior of the valve closing element; the pressure level in the supply line can also be lowered to a static pressure that is determined by the prestressing of the restoring spring of the check valve, via this check valve, after the valve closing element has been closed.

In the known pressure valve a throttle restriction precedes to the check valve and throttles the return flow of the medium under high pressure and attenuates the rapid opening movement of the valve closing element caused by it until it contacts a filler piece, in order to reduce the mechanical load on the restoring spring. For the further return of the medium into the pump work chamber, a conduit arrangement, comprising a longitudinal bore and a transverse bore, is made in the filler piece, which, along with its stroke-limiting stop function for the check valve, also reduces the idle volume in the through bore. The options for variation of the opening pressure of the check valve and of the diameter of the upstream throttle are components of the adaptation of the total fuel injection system to the requirements of the internal combustion engine to be supplied.

If certain threshold values of peak pump pressure and the injection quantity are exceeded, the safe function of the known pressure valve is no longer assured. The throttling is no longer clearly effected at the upstream throttle; instead, the filler piece and the spring plate of the check valve work as downstream throttles, which impedes optimum adaptation of the fuel injection system to the internal combustion engine.

OBJECT AND SUMMARY OF THE INVENTION

In contrast, the pressure valve in accordance with the invention has an advantage that, because of the shape of the spring plate, an undesired throttling effect is avoided at this point and, at the same time, the idle volume on the side of the pump work chamber is nonetheless maintained as small as possible. In order not to impair the axial guidance of the spring plate in the through bore of the pressure valve closing element, a through conduit is arranged, in accordance with the invention, in the spring plate that can be dimensioned in such a way without its function being impaired that a constriction of the medium flowing away can assuredly be avoided.

Another option for decreasing the throttling effect on the spring plate during simultaneous, reliable axial guidance in the through bore in the interior of the pressure valve closing element can be attained in that four flattened faces are arranged along the perimeter of the spring plate over which the medium under high pressure can flow away quickly and unrestricted, while a reliable guidance of the spring plate across the remaining circumference area remains assured.

By means of a progressively wound spring, an attenuated opening movement of the check valve is achieved that reduces the mechanical load on the spring and increases its durability.

To also be able to prevent a possible throttling effect at the filler piece, there is another conduit to the side facing the pump work chamber which, analogous to the above transverse bores, leads into the longitudinal bore. This additional conduit is connected by a flattened face or a longitudinal slot at the filler piece to the part of the through bore that receives the restoring spring so that the medium under high pressure can also flow away quickly and unrestricted over this additional lead.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
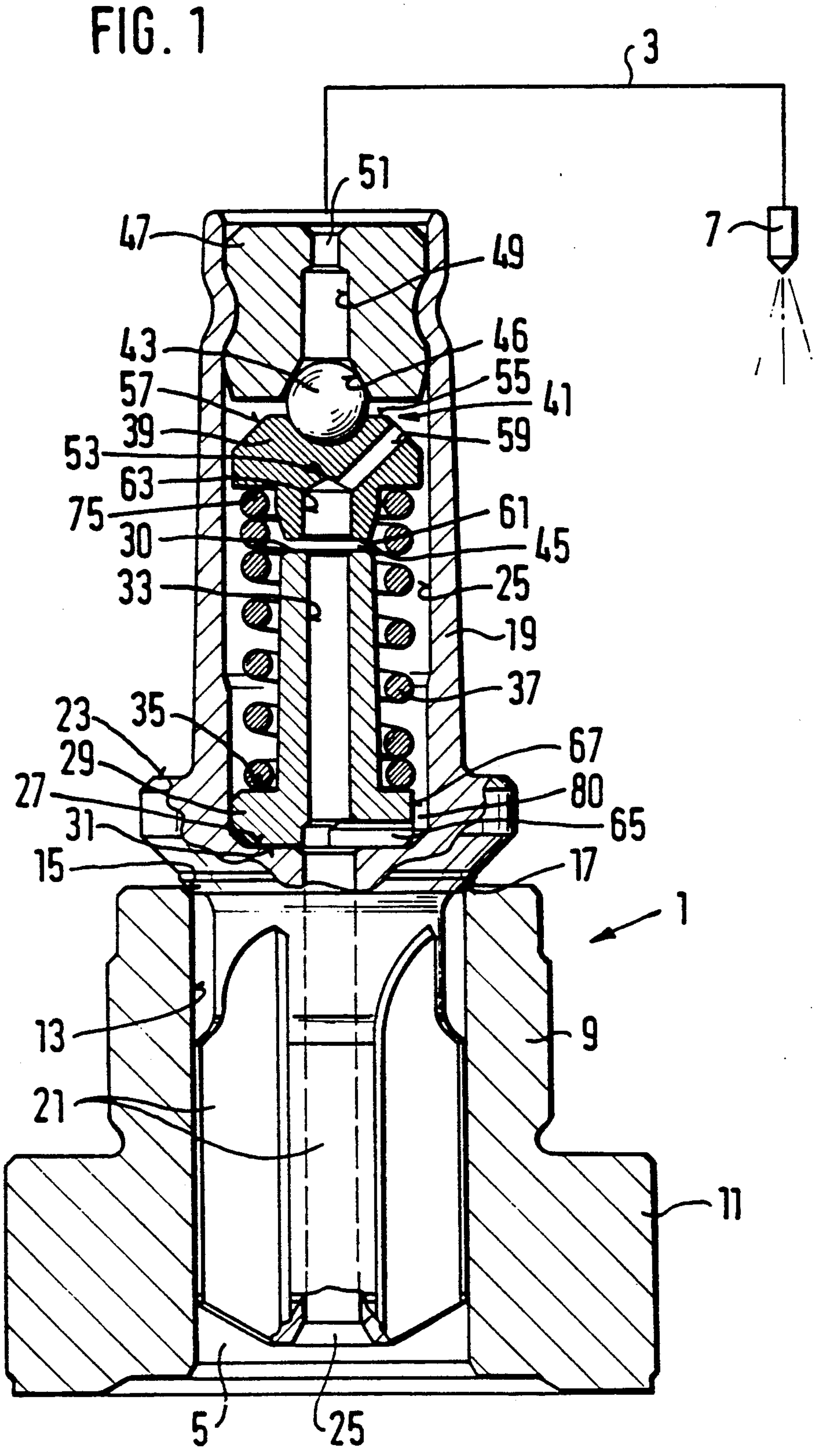
FIG. 1 shows a longitudinal section through a first exemplary embodiment of a pressure valve constructed as a balanced pressure valve and having a conduit arrangement in the spring plate and an additional transverse bore in the filler piece.

FIG. 1 shows a longitudinal section through a pressure valve 1 that is inserted into a housing (not represented) of a fuel injection pump and connected in a supply line 3 between partially represented pump work chamber 5 of the fuel injection pump and an injection location 7 in the form of an injection valve of the internal combustion engine to be provided, likewise not represented. The pressure valve 1 comprises a tubular valve body 9 that has a protruding shoulder which forms an outer circumference at the lower end toward the pump and a through conduit 13 in the interior in the form of an axial bore. At the upper end, facing away from the pump work chamber 5, the valve body 9 has a valve seat 15, on which a conical flat face 17 of a pressure valve closing element 19 that forms the other part of the pressure valve 11 comes to rest. The valve closing element 19, in the known way, has wing-shaped guide surfaces 21, which are guided in the through conduit 13 of the valve body 9 and between which fuel can pass to the valve seat 15. The pressure valve closing element 19 has a shoulder 23 on its circumference with which a compression spring (not represented) is engaged that is supported in a spring chamber (also not represented) that surrounds the pressure valve closing element 19 and thus keeps the pressure valve closing element 19 with its flat faces pressed against the valve seat 15. The pressure valve closing element 19 also has an axial through conduit 25 in its interior that is embodied as an axial stepped bore and which also forms a shoulder 27 to another, tapered part of the bore that leads to the pump work chamber 5 in the area of the guide faces 21. A filler piece 29 comes to rest, with its face end 31 toward the pump work chamber 5, on this shoulder 27, and has in its interior an axial through bore 33 with which it produces a connection between the through conduit 25 of the pressure valve closing element 19 and the through conduit 13 of the valve body 9. The filler piece 29 is guided with its circumference area in the through conduit 25 and forms a shoulder 35 via another reduction in outside diameter against which a restoring spring surrounding the filler piece 29 in the form of a compression spring 37 is supported and that impinges upon a spring plate 39 of a check valve 41 that guides a sphere-shaped valve closing element 43, wherein the upper face end 45 of the filler piece 29 facing away from the pump work chamber 5 forms a travel-limiting stop 30 for the spring plate 39. The valve closing element 43 of the of the check valve 41 opening toward the pump work chamber 5 is pressed by the compression spring 37 onto a valve seat 46 that is formed by a liner 47 that seals the through conduit 25 in the pressure valve closing element 19 on the end remote from the pump work chamber 5, and that has in its interior a through bore 49 with a reduced diameter in comparison to the through conduit 25 on the pump work chamber side; this through bore is viewed here as an element of the stepped through conduit 25 and expands conically toward the valve closing element 43, thus forming the valve seat 46. A throttle 51 is arranged in the above area facing away from the pump work chamber 5 of the through bore 49.

Because the spring plate 39 is wedged tightly against the wall of the through conduit 25, it has a conduit 53 in its interior that connects the chamber in front of and behind the spring plate 39 within the through conduit 25. For this its face end 55 facing the valve closing element 43 is provided with a chamfer 57 that is arranged in at least one bore 59 that discharges into an axial blind bore 63 originating from the face end 61 facing the compression spring 37. This blind bore lies opposite the through bore so that after addition of the spring plate 39 to the impact face 30 of the filler piece 29, a connection exists between the injection location 7 and the pump work chamber 5.

A shoulder 75 is arranged on the circumference of the face of the spring plate 39 facing the filler piece 29, against which the compression spring 37 comes to rest. To be able to avoid a throttling effect inside the through conduit 25, groove 65 is made in the filler piece 29 at the level of the face end 31, or a radial conduit is made in the face end 31 that is connected to the element of the through conduit 25 that receives the compression spring via a conduit 80 formed between a flattened face 67 at the circumference of the filler piece 29 and the through conduit 25. A longitudinal conduit can replace the flattened face 67, because with this arrangement a large part of the circumference of the filler piece 29 remains securely guided in the through conduit.

Figure 2:
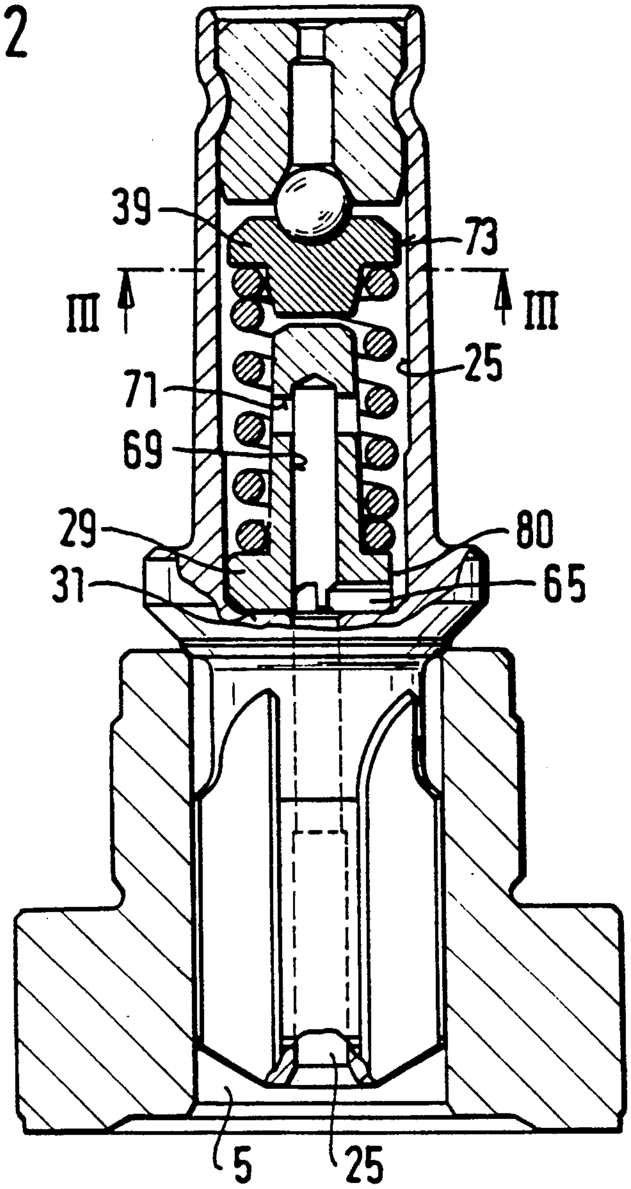
FIG. 2 shows a second exemplary embodiment analogous to the one shown in FIG. 1 whose spring plate has four recesses around its circumference.
Figure 3:
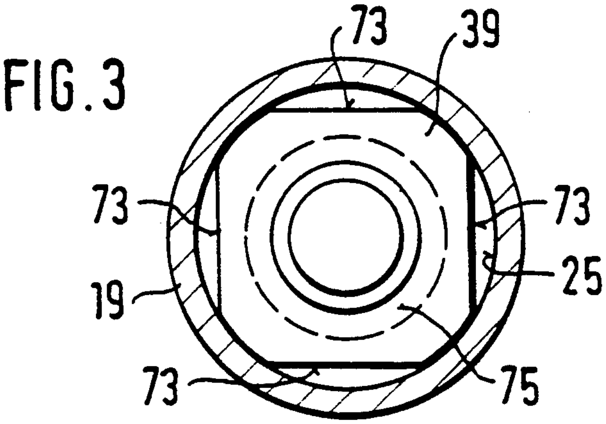
FIG. 3 shows a detail from FIG. 2 in which the spring plate in accordance with the invention is represented in cross-section.

The second exemplary embodiment represented in FIGS. 2 and 3 distinguishes itself from the one in FIG. 1 solely in the embodiment of the spring plate 39 and the filler piece 29. Here the filler piece 29 has in its interior a blind bore 69, which originates at the face end 31 facing the pump work chamber 5 and borders on the tapered part of the through conduit 25, and into which two transverse bores 71 discharge on the end facing the spring plate 39. The spring plate 39 does not have a conduit 53 here, but permits the fuel to flow past via four flattened faces 73 on its outer circumference, as the sectional view of FIG. 3 shows. The additional transverse bore 65 at the filler piece 29, which with its additional overflow cross-section reliably avoids a throttling effect inside the through conduit 25, even at high fuel pressures and injection quantities, is also shown in this exemplary embodiment.

The pressure valve in accordance with the invention operates in the following manner.

If, during operation of a fuel injection pump built into the pressure valve 1 described above, fuel is pumped to the injection location 7 of the engine, the pressure valve closing element 19 is lifted from the valve seat 15 of the valve body 9 under the pressure of the fuel flowing from the pump work chamber 5, and the pressure valve 1 opens. If the feed pressure of the fuel drops at the end of fuel pumping, the force of the flowing fuel is no longer sufficient to hold the pressure valve closing element 19 open counter to the force of the compression spring; the pressure valve closing element 19 returns to its valve seat 15, and the pressure valve closes. Subsequent to this abrupt interruption of fuel pumping, pressure waves run back and forth in the volume confined between the pressure valve 1 and the injection location 7. To avoid a resultant later re-injection at the injection location, the pressure level of the pressure wave peak pressures in the supply line 3 is now reduced via the check valve 41 to a particular amount by having the fuel raise the valve closing element 43, counter to the force of the compression spring 37, from its valve seat 45 and flow back via the through conduit 25 into the pump work chamber 5, which is now relieved at the end of the highpressure pumping phase. During this the fuel is constricted at the throttle restriction 51 upstream of the check valve 41 in order to avoid an overly fast pushing open of the valve closing element 43. This damped opening movement of the check valve 41 is additionally supported during the process by the progressively wound compression spring 37. Inside the through conduit 25 the flowing fuel can flow unimpeded because of the measures described above, so that throttling effects can reliably be avoided.

Thus eliminating throttling inside the through conduit 25 in the pressure valve closing element 19 in this way, which can be further reinforced by a larger dimensioning of the individual flow diameters, it becomes possible to carry out the hydraulic design of the overall fuel injection system unequivocally via the opening pressure and the diameter of the throttle 51.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure valve (1) to be secured into a supply line (3) between a pump work chamber (5) of a fuel injection pump and an injection location (7) of an internal combustion engine to be supplied by said pressure valve, a valve body (9) that is provided with a first valve seat (15), said valve body (9) has a through conduit (13) in which a pressure valve closing element (19) that opens toward the injection location counter to a spring force is guided, an interior of the pressure valve closing body is embodied as a stepped through conduit (25) and includes a check valve (41) that opens toward the pump work chamber (5), a valve closing element (43) is disposed between a second valve seat (46) formed by a liner (47) in the pressure valve closing element (19) and a spring plate (39) impinged upon by a compression spring (37), the compression spring (37) is supported on one end by a shoulder (35) of a filler piece (29) which includes an axial bore (33, 69) and guides the compression spring (37) that rests with a first face end (31) remote from the check valve (41) against a shoulder (27) of the through conduit (25), said filler piece (29) has a groove (65) in the first face end (31) that discharges into the axial bore (33, 69) that communicates with a portion of the through conduit (25) in the interior of the pressure valve closing element (19) which contains the compression spring (37), via a longitudinal conduit passage (80) between a face (67) and the valve closing element 19 and, with a second face end (45) which forms a stop (30) for the spring plate (39), the spring plate (39) has a through conduit (53) which connects a first chamber facing toward the valve closing element (43) to a second chamber facing away from the valve closing element (43).

2. The pressure valve in accordance with claim 1, in which the through conduit (53) in the spring plate (39) is formed by a blind bore (63) that originates at a third face end (61) that faces the compression spring (37), at least one bore (59) originating at a fourth face end (55) remote from the compression spring (37) discharges into said blind bore.

3. The pressure valve in accordance with claim 1, in which the spring plate (39) has a plurality of flattened faces (73) on a circular circumferential surface which function as passages in combination with the conduit (25) of the valve closing element (19).

4. The pressure valve in accordance with claim 3, in which the flattened faces (73) are spaced equally apart from one another and preferably have the same dimensions.

5. The pressure valve in accordance with claim 1, in which a fourth face end (55) toward the valve closing element (43) is tapered frustoconically with a central recess in the end face for receiving a sphere that forms the valve closing element (43).

6. A pressure valve in accordance with claim 1, in which the compression spring (37) of the check valve (41) is progressively wound.

7. A pressure valve in accordance with claim 1, in which the groove (65) is machined into the first face end (31) remote from the compression spring (37).

8. A pressure valve in accordance with claim 1, in which the groove (65) discharges into the axial bore (33, 69) that communicates with a portion of the through conduit (25) in the interior of the pressure valve closing element (19) that receives the compression spring (37), via a flattened face (67), on a circumference of the filler piece (29) between the filler piece and the closing element (19).

9. A pressure valve in accordance with claim 7, in which the groove (65) that is machined into the face end (31) remote from the compression spring (37) communicates with a portion of the through conduit (25) in the interior of the pressure valve closing element (19) that receives the compression spring (37), via a flattened face (67), on the circumference of the filler piece (29) between the filler piece and the closing element (19).

* * * * *